United States Patent [19]

Heimbigner et al.

[11] Patent Number: 4,708,540
[45] Date of Patent: Nov. 24, 1987

[54] WIRE LOCK LINER

[75] Inventors: Thomas Heimbigner, Bellflower; Gary Tsui, Rosemead, both of Calif.

[73] Assignee: CBC Industries, Inc., Commerce, Calif.

[21] Appl. No.: 889,287

[22] Filed: Jul. 22, 1986

Related U.S. Application Data

[63] Continuation of Ser. No. 733,118, May 13, 1985, abandoned.

[51] Int. Cl.$^4$ .............................................. B23B 49/02
[52] U.S. Cl. .............................. 408/72 B; 408/115 B; 408/241 B
[58] Field of Search .............. 408/72 R, 72 B, 115 R, 408/115 B, 241 R, 241 B, 75, 79, 80, 84, 241 G

[56]  References Cited

U.S. PATENT DOCUMENTS 3,015,242  1/1962  Armacost ........................ 408/241 B
3,306,137  2/1967  Mele .............................. 408/241 B
3,535,956  10/1970 Gnoth ............................ 408/241 B Primary Examiner—Gil Weidenfeld
Assistant Examiner—Glenn L. Webb
Attorney, Agent, or Firm—Beehler, Pavitt, Siegemund, Jagger, Martella & Dawes

[57]  ABSTRACT

A two-part drill bushing assembly makes use of a sleeve, identified in the trade as a lock liner bushing which is embedded in a jig plate for reception of a separate slip renewable bushing element. Extending through the renewable bushing element is an axial bore within which a drill bit rotates during operation on a workpiece. On the exterior of the renewable bushing element is a helical shoulder which, when rotated, interlocks with a locking shoulder of the liner bushing. The invention involves a stiff wire rod, a mid-portion of which is bent to form the locking shoulder and from which legs extend to positions of snapped-on attachment to the liner bushing.

4 Claims, 5 Drawing Figures

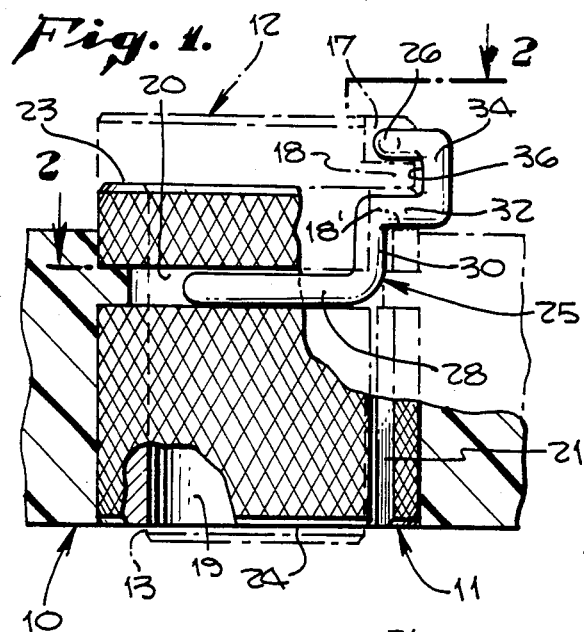
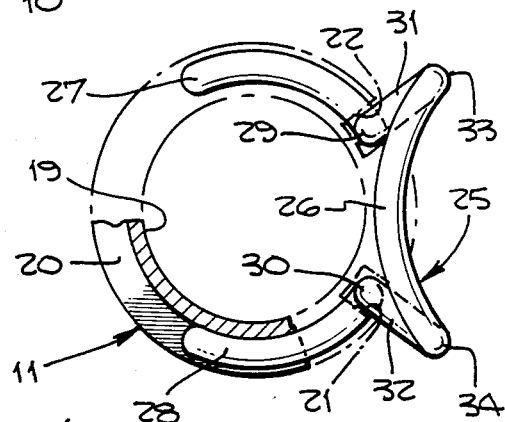
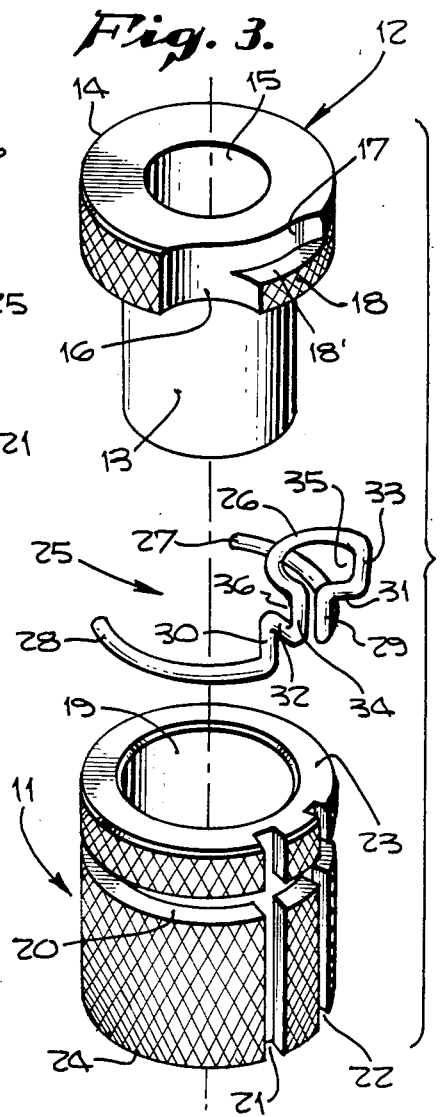
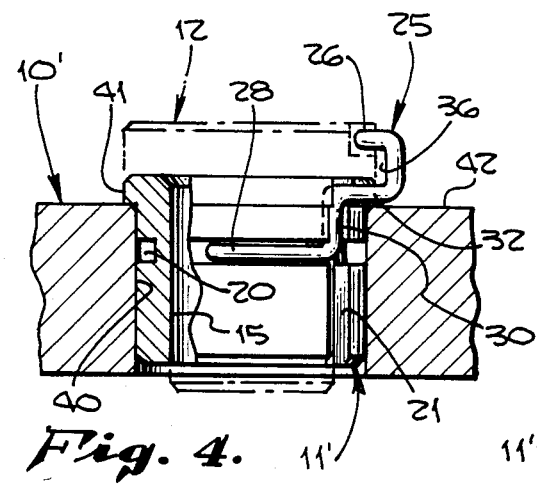
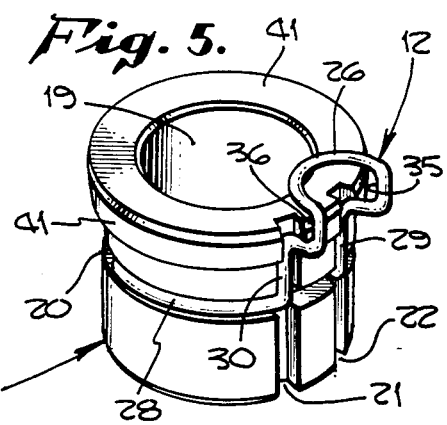

WIRE LOCK LINER

This application is a continuation of abandoned Ser. No. 733,118 filed May 13, 1985.

The invention here involved is directed to tool guide bushings of the type frequently referred to as slip renewable tool guide bushing and an improvement on U.S. Pat. No. 3,015,242.

Two part bushings of this construction are commonly used in jig plates suited for drilling a multiple number of holes in a workpiece. In keeping with conventional practice, there is an outer liner bushing, which is the part actually fastened in an aperture in the jig plate, the liner bushing being adapted to receive a tool guide bushing through which a cutting tool, such, for example, as a drill bit, is extended and rotated in order to bore a hole in the workpiece. There is an interlock between the tool guide bushing and the liner bushing which becomes operative immediately preceding the drilling operation to hold the parts together but in a releasable fashion so that as soon as the hole has been drilled by the tool, a reversal in rotation of the tool disengages the parts so that the tool can be promptly moved over the jig plate to another location for a second, and succeeding operations.

Although liner bushings and accompanying slip renewable tool guide bushings of the type described have been in use for an appreciable length of time and have been very acceptable, the cost of manufacture has been appreciable. Such manufacture involves a number of careful machining operations at relatively close tolerance in order to provide an acceptable dependable product.

It is therefore among the objects of the invention to provide a new and improved liner bushing of the type usable with a slip renewable guide bushing, which is relatively lower in cost that those heretofore available, while at the same time one which is dependable and effective in its operation.

Another object of the invention is to provide a new and improved liner bushing of the type usable with slip renewable guide bushings which, while being constructed of parts relatively lower in cost, is of a construction such that the assembly is dependable and results in a tool capable of holding work tolerances to a degree acceptable to current manufacturing requirements.

Still another object of the invention is to provide a new and improved liner bushing component for use with a slip renewable guide bushing in which three is less need for fine machine operations, while at the same time maintaining substantially all of the advantages heretofore available in devices of comparable character relatively higher in cost.

Still further among the objects of the invention is to provide a new and improved liner bushing component in two parts in an arrangement substantially minimizing the machining operations needed for the part embedded in the jig plate and substituting for that part of the liner bushing component, which is normally engaged by the guide bushing, an independently formed shoulder constructed of wire or rod merely bent into proper position and capable of being snapped into place.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

In the drawings:

FIG. 1 is a side elevational view of the assembled device embedded in a drill jig with one part shown in phantom lines.

FIG. 2 is a plan view, partially in section, on the line 2—2 of FIG. 1.

FIG. 3 is an exploded view of parts of the device shown in FIG. 1.

FIG. 4 is a side elevational view of a second form of the device in assembled condition shown embedded in a jig plate.

FIG. 5 is a side perspective view of the form of device of FIG. 4.

In one form of the device chosen for the purpose of illustration, the device in assembled condition is shown molded in a plastic jig plate 10. A lock liner bushing component 11, shown in solid lines, is shown with a slip renewable guide bushing component 12 in phantom lines assembled with it.

The slip renewable bushing component 12, shown in solid lines in FIG. 3, is substantially conventional and consists of a stem portion 13, at one end of which is an integral head portion 14, and through which extends a tool receiving opening 15. On one side of the head portion 14, knurled as shown, there is a recess 16 from which extends an arcuate surface 17 which assists in defining a tongue 18, the upper surface 18 ' of which may have a helical disposition.

For the accomodation of the slip renewable bushing component 12, the lock liner bushing componet is provided with a cylindrical bore 19. When the lock liner bushing component is to be used with a plastic jig plate 10, substantially the entire external surface will be provided with knurling.

Extending circumferentially around the exterior of the lock liner bushing component 11 is a circumferentially disposed groove 20. There are two axially disposed recess means 21 and 22 on the exterior surface of the lock liner bushing component which are struck through the exterior surface from a upper end 23 to a lower end 24, the axially disposed recesses 21 and 22 having substantially the same depth and width configurations as the circumferentially extending recess 20 and struck through the recess 20 as shown advantageously in FIG. 3.

Forming part of the lock liner bushing component is a wire rod member 25, shown in perspective view in FIG. 3. Substantially midway between opposite ends of the wire rod member there is an arcuate bend which, in use, lies in a horizontal direction and provides a shoulder 26 for cooperation with the slip renewable bushing 12. To hold the shoulder 26 in operable position, the wire rod member 25 is provided adjacent opposite ends with arcuately bent legs 27 and 28 which are adapted to be lodged in the circumferentially extending groove 20. Interconnecting the shoulder 26 with the legs 27 and 28 are intermediate portions having axially extending elements 29 and 30 to which are connected radially extending elements 31 and 32, in turn connected to additional axially extending elements 33 and 34.

As can be observed from FIGS. 1 and 2, the radially extending elements 31 and 32 are long enough to project outwardly a distance sufficient to have recesses 35 and 36 able to receive the tongue 18 of the slip renewable bushing 12.

It will be appreciated that by lodging the legs 27 and 28 in the circumferentially extending groove 20, the wire rod member 25 is anchored against axial dislodgment once the assembly is mounted in the jig plate 10. To prevent circumferential dislodgment, the axially extending elements 29 and 30 are lodged in extensions, respectively, of the axially disposed recesses 22 and 21. When embedded in a plastic jig plate 10, as suggested in FIG. 1, the material of the jig plate is compacted and hardened in the groove 20 and recesses 21 and 22, as well as in and around adjacent portions of the wire rod member 25.

In operation a slip renewable bushing component 12 will be chosen with a tool receiving opening 15 of a diameter suited to accommodate a cutting tool of corresponding outside diameter. The stem portion 13 of the component 12 is projected into the bore 19 of the component 11 in an orientation such that the recess 16 passes the shoulder 26. The bushing 12 is then rotated in a direction clockwise, as viewed in FIG. 3, to a position where the tongue 18 is lodged beneath the shoulder 26 with the helical surface of the tongue 18 in engagement with the shoulder 26 and the shoulder 26 being lodged within the arcuate surface 17. The tool components are in this fashion interlocked with each other during projection of the tool through the tool receiving opening for operation on an appropriate workpiece (not shown).

When a device incorporating the invention is to be made use of with a metal jig plate 10', as shown in FIG. 4, a lock liner bushing component 11' is provided having a smooth exterior surface instead of being knurled, as in the case of FIGS. 1 and 2. When the bushing component 11' is projected through an opening 40 in the jig plate 10', it is pushed into position until a flange 41 of the component 11 engages an adjacent surface 42. Except for provision of the smooth surface, and the flange 41 as described, the component 11' is substantially the same as the component 11, equipped as described with the wire rod member 25. It will be understood that the groove 20 is deep enough so that legs 27 and 28 of the wire rod member 25 are contained entirely within the groove so as to afford no obstruction to pressing the assembly into the position shown in FIG. 4. Similarly, the axially extending recesses 21 and 22 are deep enough to completely contain the axially extending elements 29 and 30 of the wire rod member.

It should further be appreciated that by having the arcuately bent legs 27 and 28 long enough to extend past midportions of the groove 20, the wire rod member 25 may be snapped into position when assembled by the inherent resilience of the wire rod member which will also retain the legs in engaged position, as shown advantageously in FIGS. 2 and 5. Accordingly, the component 11 can be readily made from rod stock of virtually any selected diameter by a lathe operation and by a similar operation being provided with the bore 19. Tooling for bending of the wire rod member 25 makes it feasible to form the wire rod member separately and merely snap it into position in the grooves 21 and 22 when needed, in which position it will remain until embedded in the jig plate. The diameter of the wire rod material can be readily one chosen as compatible with the size required for adequate strength, where components 11 may be of size chosen to accommodate slip renewable bushings of different size.

While particular embodiments of the present invention have been shown and described, it will be obvious to those skilled in the art that changes and modifications may be made without departing from the invention in its broader aspects, and therefore the aim of its appended claims is to cover all such changes and modifications as fall within the true spirit and scope of this invention.

Having described the invention, what is claimed as new in support of Letters Patent is as follows:

1. A liner bushing component for a slip renewable guide bushing component wherein the guide bushing component is provided with an interlocking projection, said liner bushing component comprising a substantially cylindrical sleeve having an interior wall forming a cylindrical bore for reception of the guide bushing component, an exterior wall and opposite end edges, a circumferentially extending recess means in the exterior wall and a pair of axially disposed slot means in the exterior wall, a separate interlock rod member for the cylindrical sleeve comprising a shoulder element spaced endwardly outward from one of said end edges, attachment means with separate attachment elements disposed in said circumferentially extending recess means on respective opposite sides, and an interconnecting member between each of said attachment elements and respective opposite sides of said shoulder element, said interconnecting member being lodged in said axially disposed slot means, said shoulder element comprising a first bent configuration intermediate opposite ends of the interlock rod member, said attachment elements comprising second bent configurations of said interlock rod member, and said interconnecting members each comprising third bent configurations of said interlock rod member, said interconnecting members being of functional yieldability in an axial direction.

2. A liner bushing component as in claim 1 wherein said axially disposed slot means comprises two slots extending from the circumferentially extending recess means through a portion of the adjacent end edge and there is an interconnecting member in each axially disposed slot means whereby to fix the positions of said interconnecting members with respect to each other.

3. A liner bushing component as in claim 1 wherein the two interconnecting members extend radially outwardly to a location spaced outwardly from the exterior wall.

4. A liner bushing component as in claim 1 wherein the second bent configurations are separated from each other at corresponding spaced locations and each of said second bent configurations have a length sufficient to extend arcuately around the circumference of the cylindrical sleeve throughout locations on diametrically opposite sides sufficient to provide a snap-on retention attachment between the separate interlock member and the exterior wall.

* * * * *